(12) United States Patent
Runk et al.

(10) Patent No.: US 6,823,690 B2
(45) Date of Patent: Nov. 30, 2004

(54) INTEGRATED ELECTRICAL GENERATOR/ STARTER AND AIR CONDITIONING COMPRESSOR DEVICE AND SYSTEM AND METHOD FOR CONTROLLING SAME

(75) Inventors: Robert Michael Runk, N. Tonawanda, NY (US); John F. O'Brien, Lockport, NY (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/379,499

(22) Filed: Mar. 4, 2003

(65) Prior Publication Data

US 2004/0172955 A1 Sep. 9, 2004

(51) Int. Cl.[7] .................................................. B60H 1/32
(52) U.S. Cl. ........................ 62/323.3; 62/133; 62/236; 62/323.4; 62/505
(58) Field of Search ........................... 62/323.3, 323.4, 62/323.1, 236, 133, 505

(56) References Cited

U.S. PATENT DOCUMENTS 5,075,616 A * 12/1991 Mitsui .......................... 322/10
5,475,985 A * 12/1995 Heinrichs et al. .......... 62/505 X
6,351,957 B2    3/2002 Hara ............................ 62/133
6,631,703 B2 * 10/2003 Tonnqvist et al. ......... 123/198 R
6,640,562 B2 * 11/2003 Odachi et al. ................ 62/133

FOREIGN PATENT DOCUMENTS

| EP | 0978653 A | 2/2000 |
| EP | 1110774 A | 6/2001 |
| EP | 1221391 A | 7/2002 |
| EP | 1331115 A | 7/2003 |

* cited by examiner

Primary Examiner—Harry B. Tanner
(74) Attorney, Agent, or Firm—Patrick M. Griffin

(57) ABSTRACT

An integrated electrical generator/starter and air conditioning compressor device driven by a common drive shaft, or other direct linkage. The device includes an electrical generator/starter and a compressor. The electrical generator/starter is coupled to the drive shaft. The compressor is coupled to the electrical generator/starter and to the drive shaft and acts to pressurize a flow of refrigerant in response to rotation of the drive shaft. The electrical generator/starter is operable in first and second states. In the first state, the electrical generator/starter generates electricity in response to rotation of the drive shaft. In the second state, the electrical generator/starter utilizes electrical power from a battery to rotate the drive shaft.

35 Claims, 3 Drawing Sheets

INTEGRATED ELECTRICAL GENERATOR/ STARTER AND AIR CONDITIONING COMPRESSOR DEVICE AND SYSTEM AND METHOD FOR CONTROLLING SAME

FIELD OF THE INVENTION

The present invention relates generally to electrical generator/starters and air conditioning compressors, and more particularly, to an integrated electrical generator/starter and compressor device.

BACKGROUND OF THE INVENTION

In current automotive applications, there are numerous components connected directly to the engine's crankshaft that are required to perform the various vehicle functions. Three such components are the electrical generator/ alternator, the air conditioning compressor, and the starter. The electrical generator/alternator uses an electric machine to generate the vehicle's electrical energy. The compressor is driven by the crankshaft and is used by the HVAC system to cool the vehicle's cabin. The starter is mounted on the rear of the engine block and is connected to the crankshaft through the flywheel or flexplate to start the engine. Each of these components adds mass, cost, and requires packaging space.

As manufacturers pursue improved fuel economy goals, a start/stop engine management concept has emerged. This approach enables the vehicle's engine to be shut-off periodically during idle stop times, e.g., stop lights/signs, city traffic stop and go driving, and then re-started when requested by the driver (by e.g., actuation of the accelerator pedal). One such approach uses a generator/starter combination device.

However, some consideration must be given as to how cabin comfort is maintained during these engine off occurrences. Current technology uses an engine-belt drive compressor. When the engine is off, there is no power to drive the compressor and therefore cabin comfort suffers.

One solution is to simply request that the engine re-starts when cabin comfort, i.e., temperature, suffers. However, this approach will have a negative effect on fuel economy.

Another solution is to use a fully electrically drive compressor system which could be run at any time cabin cooling is required. However, this may also negatively affect fuel economy, in that the electric power is taken from the battery which must be charged via the alternator. There are significant efficiency losses associated with the electromechanical creation and use of this electrical energy.

The present invention is aimed at one or more of the problems, as set forth above.

SUMMARY OF THE INVENTION AND ADVANTAGES

In one aspect of the present invention an integrated electrical generator/starter and compressor device is provided. The device is adapted to be driven by a common drive shaft and includes an electrical generator/starter and a compressor. The electrical generator/starter is coupled to the drive shaft. The compressor is coupled to the electrical generator/starter and to the drive shaft and acts to pressurize a flow of refrigerant in response to rotation of the drive shaft. The electrical generator/starter is operable in first and second states. In the first state, the electrical generator/starter generates electricity in response to rotation of the drive shaft. In the second state, the electrical generator/starter utilizes electrical power from a battery to rotate the drive shaft.

In another aspect of the present invention, a system for use with an engine having a first drive shaft is provided. The system includes a clutch mechanism and a drive belt for coupling the first drive shaft and the clutch mechanism. A second drive shaft is coupled to the clutch mechanism. The clutch mechanism is adapted to controllably engage and release the second drive shaft thereby coupling and de-coupling the first and second drive shafts, respectively. An electrical generator/starter is coupled to the second drive shaft. A battery is coupled to the electrical generator/starter. A compressor is coupled to the electrical generator/starter and to the drive shaft and acts to pressurize a flow of coolant in response to rotation of the second drive shaft. The electrical generator/starter generates electricity in response to rotation of the second drive shaft while in a first state and utilizes electrical power from the battery to rotate the second drive shaft while in the second state. A controller is coupled to the electrical generator/starter, the compressor and the clutch mechanism and controls operation thereof in accordance of a plurality of modes of operation.

In still another aspect of the present invention, a method for controlling operation of an electrical generator/starter and a compressor for use with an engine having a first drive shaft is provided. The first drive is coupled to a second drive shaft by a clutch mechanism. The electrical generator/starter and the compressor are mechanically coupled to and integral with each other and coupled to the second drive shaft. The clutch mechanism is adapted to controllably engage and release the second drive shaft thereby coupling and de-coupling the first and second drive shafts respectively. The compressor is adapted to pressurize a flow of coolant in response to rotation of the second drive shaft, The electrical generator/starter is adapted to generate electricity in response to rotation of the second drive shaft while in a first state and for utilizing electrical power from a battery to operate the electrical generator/starter to rotate the second drive while in a second state. The method includes the steps of entering one of a first mode and a second mode, engaging the clutch mechanism and placing the electrical generator/ starter in the second state in response to being in the first mode, and engaging the clutch mechanism and placing the electrical generator/starter in the first state in response to entering the second mode.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
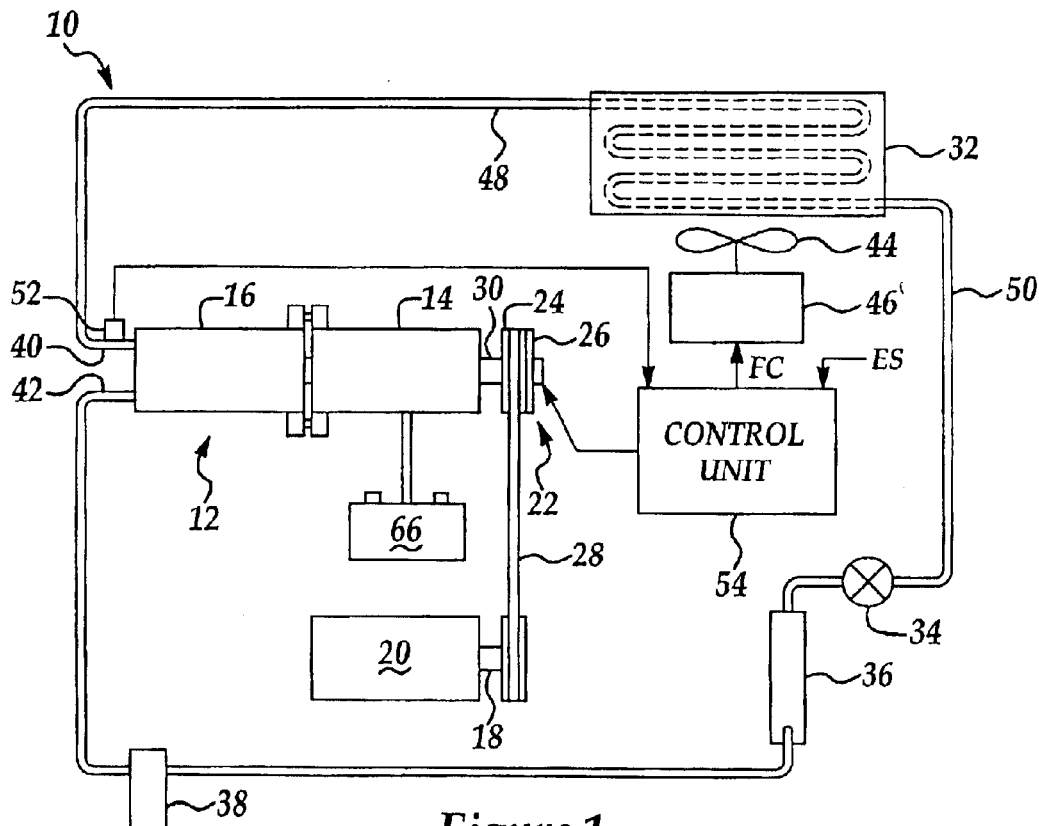
FIG. 1 is a diagrammatic illustration of an automotive electrical and HVAC system having an integrated generator/ starter and refrigerant compressor device, according to an embodiment of the present invention.

With reference to FIG. 1, the reference number 10 generally designates an automotive electrical and HVAC system, including an integrated electrical generator/starter and refrigerant compressor device 12. The device 12 includes an electrical generator/starter 14 and a compressor 16. The device 12 is coupled to a first drive shaft 18 of an engine 20 by a clutch mechanism 22. The engine 20 may be, e.g., the engine 20 of an automobile (not shown). In the illustrated embodiment, the clutch mechanism 22 includes a drive pulley 24 and an electrically activated clutch 26. The compressor 12 is a variable displacement compressor and may be controller either pneumatically or electronically and is used to compress or pressurize refrigerant.

In the illustrated embodiment, the drive pulley 24 is coupled to the first drive shaft 18 via a drive belt 28. The drive pulley 24 is also directly coupled to a second drive shaft 30. The clutch mechanism 22 is selectively engaged or disengaged to couple and un-couple the first and second drive shafts 18, 30.

Figure 2:
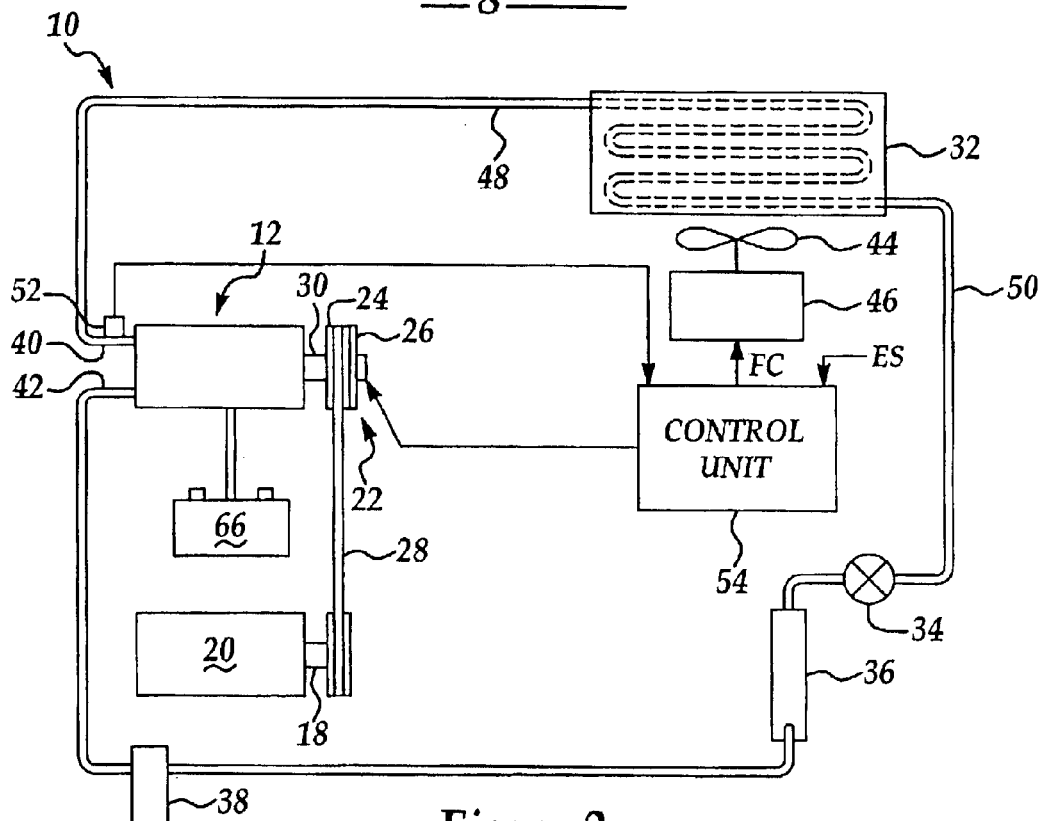
FIG. 2 is a diagrammatic illustration of an automotive electrical and HVAC system having an integrated generator/ starter and refrigerant compressor device, according to another embodiment of the present invention.

The system 10 further includes a condenser 32, an expansion device 34, an evaporator 36, and a receiver/dehydrator or an accumulator/dehydrator 38 arranged appropriately between a compressor discharge port 40 and a suction port 42. A typical schematic is shown in FIGS. 1 and 2. A cooling fan 44, operated by an electric drive motor 46, is controlled to provide supplemental airflow through the condenser 32 for removing heat from the high pressure refrigerant in line 48. It should be noted that the cooling fan 44 may also be driven by the engine 20. The expansion device 34 allows the cooled high pressure refrigerant in line 50 to expand before passing through the evaporator 36. Outside air or recirculated air may be passed or blown over the evaporator 36 and subsequently into an area to be cooled in a manner well known in the art.

The compressor 16 includes a number of internal reciprocating pistons (not shown) that successively and repeatedly pump refrigerant into the high pressure line 50 when the second drive shaft 30 is being rotated. The refrigerant pressure in line 48 is detected by a pressure transducer 52 which produces a compressor outlet pressure (COP) signal. As in conventional controls, the DC component of the COP signal may be used for one or more control purposes, including cycling the cooling fan motor 46, when present, to optimize cooling and drivability, cycling the clutch mechanism 22 to account for various ambient conditions, and disengaging the clutch mechanism 22 in the event of an abnormally high compress outlet pressure. These functions are carried out by a microprocessor based control unit or controller 54, which determines a clutch control signal (CL), and a fan control signal (FC). In one embodiment, the compressor 16 is a clutchless, continuously variable compressor. The stroke of the pistons may be modified between a minimum stroke and a maximum stroke.

Figure 3:
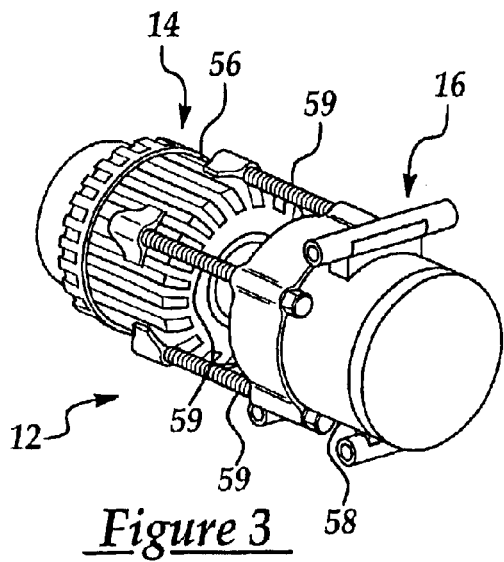
FIG. 3 is a three-dimensional view of the integrated generator/starter and refrigerant compressor device of FIG. 1.

As discussed above, the electrical generator/starter 14 and the compressor 16 are integrated. With reference to FIGS. 1 and 3 in one aspect of the present invention, the electrical generator/starter 14 includes a generator/starter housing 56 and the compressor 16 includes a compressor housing 58. As shown, the housings, 56, 58 have a generally cylindrical shape and are generally centered on the second drive shaft 30. In the illustrated embodiment of FIGS. 1 and 3, the generator/start housing 56 and the compressor housing 58 are mechanically coupled together by one or more bolts 59 threaded through the housings 56, 58.

Figure 4:
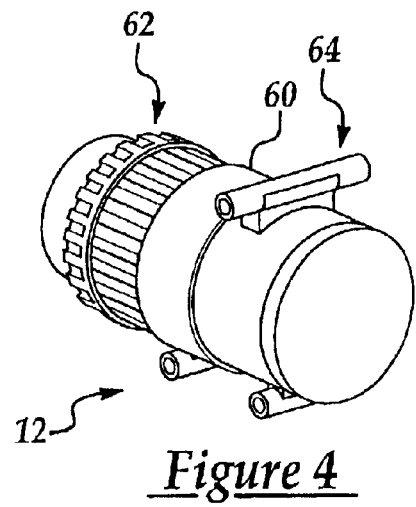
FIG. 4 is a three-dimensional view of the integrated generator/starter and refrigerant compressor device of FIG. 2.

With reference to FIGS. 2 and 4 in another aspect of the present invention, the electrical generator/starter 14 and the compressor 16 include a single integral housing 60. The integral housing 60 includes a compartment 62 to house the generator/starter 14 and a compartment 64 to house the compressor 16. Additionally, the flow of coolant through the compressor 16 may be used to cool the electrical generator/starter 14.

The compressor 16 is driven by the second drive shaft 30. The electrical generator/starter alternatively drives the second drive shaft 30 and is driven by the second drive shaft 30. In one embodiment of the present invention, the integrated device 12 may be placed in one of first and second states.

In the first state, the electrical generator/starter 14 acts as an electrical generator. When the second drive shaft 30 is rotated, the electrical generator/starter 14 converts the mechanical energy of the rotating second drive shaft 30 into electrical energy. This electrical energy may be used to power other electrical devices or systems and/or to charge a battery 66. In the second state, the electrical generator/starter 14 acts as a motor. The electrical generator/starter 14 converts electrical energy into mechanical energy, i.e., electrical energy from the battery 66 is used to impart movement to the second drive shaft 30. Thus, as discussed below, the electrical generator/starter 14 may be used as a motor to drive the compressor 16, start the engine 20, and/or supplement engine power. In one embodiment, the electrical generator/starter 14 includes a fixed speed motor. In a second embodiment, the electrical generator/starter 14 includes a variable speed motor. A suitable electrical generator/starter 14 is available from Delphi Corporation of Troy, Mich.

In another aspect of the present invention, the controller 54 is operable to control the integrated electrical generator/starter and refrigerant compressor device 10 and the clutch mechanism 22 in accordance to one or more modes of operation.

In one embodiment of the present invention, the controller 54 may operate in a first mode or a second mode.

In the first mode, the controller 54 operates to start the engine 20. For example, the automobile may be at rest with the engine off and a driver may want to start the engine 20. Typically this is accomplished using a key ignition system, in a manner well known in the art. Alternatively, the system 10 may have shut off the engine during times when engine power is not needed in order to improve fuel economy, e.g., during idle stop times.

In the first mode, the clutch mechanism 22 must be engaged and the electrical generator/starter 14 is placed in the second state. Thus, electrical energy is transferred from the battery 66 to the electrical generator/starter 14 which acts as a motor to rotate the second drive shaft 30 and to deliver mechanical energy to the engine 20 (through the drive belt 28) in order to start the engine 20. This process is well known in the art and therefore not further discussed.

Additionally, in order to minimize the load on the electrical generator/starter 14 during this process, the stroke of the piston(s) within the compressor 16 may be minimized.

After the engine 20 has been started, the controller 54 will generally enter the second control mode. In the second or "normal" control mode, the engine 20 is running and the clutch mechanism 22 is engaged. The electrical generator/starter 14 is in the first state while the system 10 is operating in the second mode. Since the clutch mechanism 22 is engaged, mechanical energy from the first drive shaft 18 is transferred to the second drive shaft 30 by the drive belt 28. The electrical generator/starter 14 (in the first state) acts as a generator to generate electricity. The generated electricity may be used to charge the batter 66 and/or to power other onboard systems. Additionally, since the second drive shaft 30 is being rotated, the compressor 16 is driven by the engine 20 through the first drive shaft 18, the drive belt 28, and the second drive shaft 30. The stroke of the piston(s) within the compressor 16 are controlled pneumatically or by the controller 54 as required to deliver the needed cooling in a manner well-known in the art.

Figure 5:
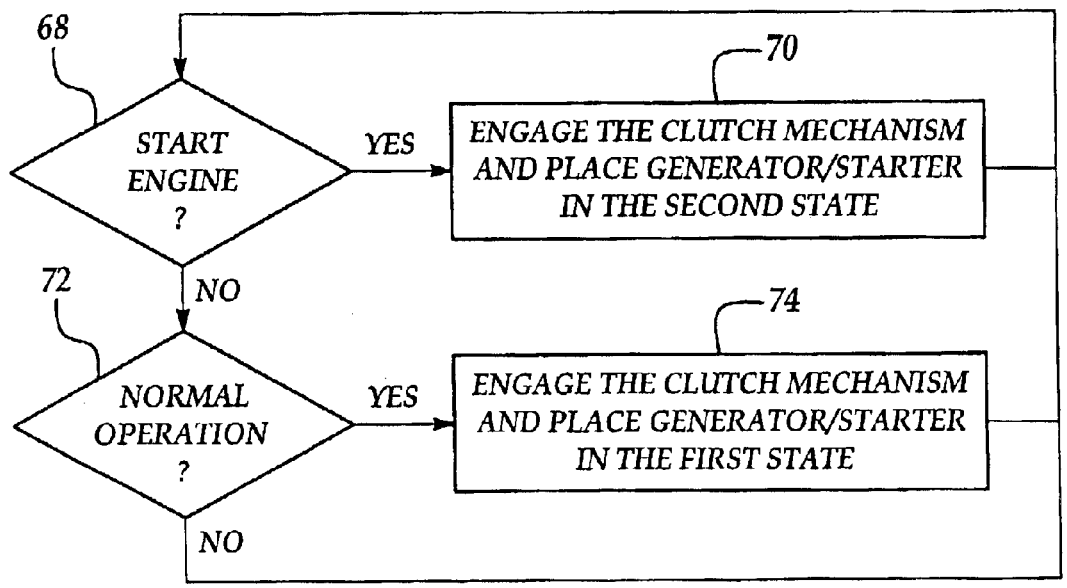
FIG. 5 is a flow diagram of the operation of the system of FIGS. 1 and 2, according to an embodiment of the present invention; and, FIG. 6 is a flow diagram of the operation of the system of FIGS. 1 and 2, according to another embodiment of the present invention.

Operation of the system 10 between the first and second modes is illustrated in FIG. 5. In a first decision block 68, if the engine 20 must be started then control proceeds to a first process block 70. In the first process block 70, the clutch mechanism 22 is engaged (unless it already is) and the electrical generator/starter 14 is placed in the second state. In a second decision block 72, if the engine 20 is running in normal operation, then control proceeds to a second process block 74. In the second process block 74, the clutch mechanism 22 is engaged (unless it already is) and the electrical generator/starter 14 is placed in the first state.

In another embodiment of the present invention, the controller 54 may operate in a first, second, third, fourth, or fifth modes.

The first and second modes are the equivalent of the above described first and second modes, i.e., the start engine and normal modes.

The third mode is used when the engine 20 cannot provide sufficient power to the compressor and is generally used when the engine is running. In one embodiment, the third mode is entered when a predetermined condition is detected. For example, the predetermined condition may be one or more of the following: engine idle, engine low speed, or maximum desired cooling. Alternatively, the predetermined condition may be a combination of engine speed and desired cooling.

In the third mode, the clutch mechanism 22 is disengaged to de-couple the engine 20 from the compressor 16. The electrical generator/starter 14 is placed in the second state. Thus, the electrical generator/starter 14 acts as a motor and uses electrical energy from the battery 66 to rotate the second drive shaft 30, thus driving the compressor 16.

If the electrical generator/starter 14 is variable, its speed may be varied to deliver the desired cooling. If the speed of the electrical generator/starter 14 is fixed, the stroke of the piston(s) within the compressor 16 may be varied.

The fourth mode is used when the engine 20 is off and it is desired to provide cooling. For example, the fourth mode may be used if the engine 20 has been to turned off, e.g., while at a stop-light to reduce fuel usage, and cabin cooling is required, or to "pre-condition" the cabin before it is entered.

In the fourth mode, the clutch mechanism 22 is disengaged. The electrical generator/starter 14 is placed in the second stated. Thus, the electrical generator/starter 14 acts as a motor and uses electrical energy from the battery 66 to rotate the second drive shaft 30, thus driving the compressor 16. The stroke of the compressor 16 is as required to achieve the desired cooling.

The fifth mode is used to when the engine 20 cannot provide sufficient power for desired vehicle acceleration and/or to improve fuel economy during fuel acceleration. In the fifth mode, the clutch is engaged and the electrical generator/starter 14 is in the second state. Thus, the electrical generator/starter acts as a motor and uses electrical energy from the battery 66 to rotate the second drive shaft 30. Since the clutch mechanism 22 is engaged, mechanical energy from the rotating second drive shaft 30 is transferred to the engine 20 and may be used to supplement engine output power to achieve the desired acceleration. Additionally, the stroke of the compressor 16 may be minimized to minimize the load on the electrical generator/starter enabling more power to be transferred to the engine 20.

Figure 6:
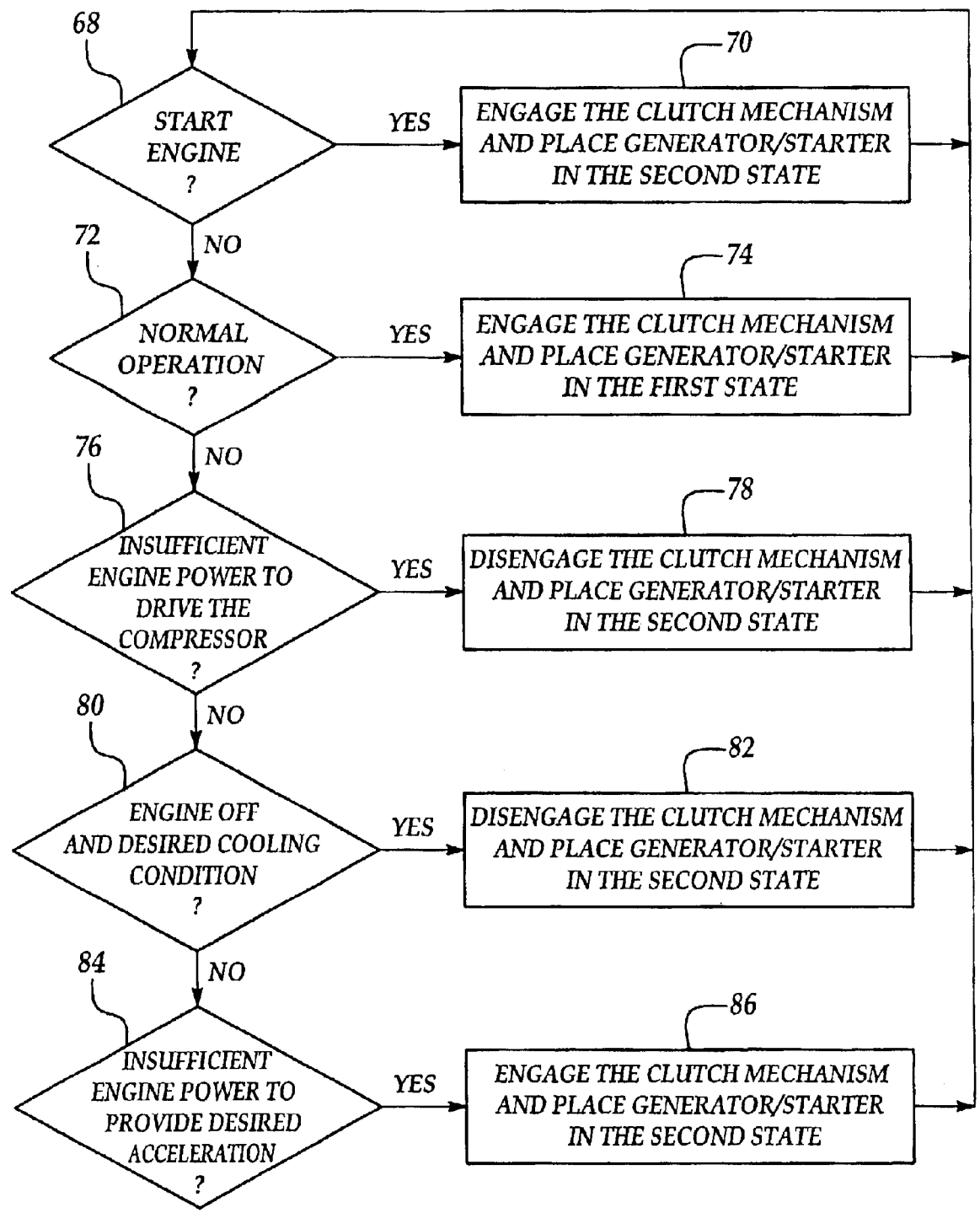

Operation of the system 10 between the first, second, third, fourth, and fifth modes is shown in FIG. 6. Operation of the first and second modes is similar as described above. In a third decision block 76, if there is insufficient power to drive the compressor 16 then control proceeds to a third process block 78. In the third process block 78, the clutch mechanism 22 is disengaged and the electrical generator/starter 14 is placed in the second stated. In a fourth decision block 80, if the engine is off and cooling is desired, then control proceeds to a fourth process block 82. In the fourth process block 82, the clutch mechanism 22 is disengaged and the electrical generator/starter 14 is placed in the second state. In a fifth decision block 84, if there is insufficient engine power to provide desired acceleration, then control proceeds to a fifth process block 86. In the fifth process block 86, the clutch mechanism 22 is disengaged and the electrical generator/starter 14 is placed in the second state.

Obviously, many modifications and variations of the present invention are possible in light of the above teachings. The invention may be practiced otherwise than as specifically described within the scope of the appended claims.

What is claimed is:

1. A system for use with an engine having a first drive shaft, comprising:
   a clutch mechanism;
   a drive belt for coupling the first drive shaft and the clutch mechanism;
   a second drive shaft coupled to the clutch mechanism, the clutch mechanism being adapted to controllably engage and release the second drive shaft thereby coupling and de-coupling the first and second drive shafts, respectively;
   an electrical generator/starter being coupled to the second drive shaft;
   a battery coupled to the electrical generator/starter;
   a compressor coupled to and integral with the electrical generator/starter and to the second drive shaft, for pressurizing a flow of coolant in response to rotation of the second drive shaft, the electrical generator/starter for generating electricity in response to rotation of the second drive shaft while in a first state and for utilizing electrical power from the battery to rotate the second drive shaft while in the second state; and,
   a controller coupled to the electrical generator/starter, the compressor and the clutch mechanism, for controlling operation thereof in accordance of a plurality of modes of operation and for detecting a predetermined condition indicating insufficient engine power to drive the compressor and to responsively enter a third mode, the predetermined condition being one of an idle condition of the engine, a low speed condition of the engine, or a desired cabin cooling condition.

2. A system, as set forth in claim 1, wherein the electrical generator/starter includes a generator/starter housing and the compressor includes a compressor housing, the generator/starter housing being coupled to the compressor housing.

3. A system, as set forth in claim 1, wherein the electrical generator/starter and compressor are within a single housing.

4. A system, as set forth in claim 3, wherein the electrical generator/starter is cooled using the flow of coolant.

5. A system, as set forth in claim 1, wherein the electrical generator/starter includes a fixed speed motor.

6. A system, as set forth in claim 1, wherein the electrical generator/starter includes a variable speed motor.

7. A system, as set forth in claim 1, wherein the compressor is a clutchless, continuously variable compressor.

8. A system, as set forth in claim 1, the compressor having at least one piston with a stroke variable between a minimum stroke and a maximum stroke.

9. A system, as set forth in claim 1, the system being operable in a first mode to start the engine.

10. A system, as set forth in claim 9, the controller being operable to engage the clutch mechanism and to place the electrical generator/starter in the second state while the system is in the first mode.

11. A system, as set forth in claim 10, the compressor having at least one piston with a variable stroke, the controller being operable to control the compressor to minimize the variable stroke while the system is in the first mode.

12. A system, as set forth in claim 1, the system being operable to provide mechanical power from the engine to the electrical generator/starter and to the compressor while in a second mode.

13. A system, as set forth in claim 12, the controller being operable to engage the clutch mechanism while in the second mode.

14. A system, as set forth in claim 13, the controller being adapted to place the electrical generator/starter in the first state while in the second mode.

15. A system, as set forth in claim 1, the controller being operable to disengage the clutch mechanism while in the third mode.

16. A system, as set forth in claim 15, the controller being adapted to place the electrical generator/starter in the second state while the system is in the third mode.

17. A system, as set forth in claim 1, the controller being adapted to detect an engine off condition and a desired cooling condition and to responsively enter a fourth mode.

18. A system, as set forth in claim 17, the controller being operable to disengage the clutch mechanism while in the fourth mode.

19. A system, as set forth in claim 18, the controller being adapted to place the electrical generator/starter in the second state while the system is in the fourth mode.

20. A system, as set forth in claim 1, the controller being adapted to detect a predetermined condition indicating insufficient engine power to provide desired engine speed and to responsively enter a fifth mode.

21. A system, as set forth in claim 20, the controller being operable to engage the clutch mechanism while in the fifth mode.

22. A system, as set forth in claim 21, the controller being adapted to place the electrical generator/starter in the second state while the system is in the fifth mode.

23. A system, as set forth in claim 22, the compressor having at least one piston with a variable stroke, the controller being operator to control the compressor to minimize the variable stroke while the system is in the fifth mode.

24. A system, as set forth in claim 1, the system being operable in a first mode to start the engine, the system being operable to provide mechanical power from the engine to the electrical generator/starter and to the compressor while in a second mode, the controller being adapted to detect a predetermined condition indicating insufficient engine power to drive the compressor and to responsively enter the third mode, the controller being adapted to detect an engine off condition and a desired cooling condition and to responsively enter a fourth mode, and the controller being to detect a predetermined condition indicating insufficient engine power to provide desired engine speed and to responsively enter a fifth mode.

25. A method for controlling operation of a electrical generator/starter and a compressor for use with an engine having a first drive shaft, the first drive shaft being coupled to a second drive shaft by a clutch mechanism, the electrical generator/starter and the compressor being mechanically coupled to and integral with each other and to the second drive shaft, the clutch mechanism being adapted to controllably engage and release the second drive shaft thereby coupling and de-coupling the first and second drive shafts respectively, the compressor being adapted to pressurize a flow of coolant in response to rotation of the second drive shaft, the electrical generator/starter being adapted to generate electricity in response to rotation of the second drive shaft while in a first state and for utilizing electrical power from a battery to operate the electrical generator/starter to rotate the second drive shaft while in a second state, the method comprising the steps of:

entering one of a first mode and a second mode;

engaging the clutch mechanism and placing the electrical generator/starter in the second state in response to being in the first mode;

engaging the clutch mechanism and placing the electrical generator/starter in the first state in response to entering the second mode; and detecting a predetermined condition indicating insufficient engine power to drive the compressor and responsively entering a third mode, the predetermined condition being one of an idle condition the engine, a low speed condition of the engine, or a desired maximum cooling condition.

26. A method, as set forth in claim 25, including the step of starting the engine while in the first mode.

27. A method, as set forth in claim 26, the compressor having at least one piston with a variable stroke, the method including the step of minimizing the variable stroke while in the first mode.

28. A method, as set forth in claim 25, including the step of generating electricity by the electrical generator/starter and charging the battery while in the second mode.

29. A method, as set forth in claim 25, including the step of disengaging the clutch mechanism and placing the electrical generator/starter in the second state while in the third mode.

30. A method, as set forth in claim 25, including the steps of detecting an engine off condition and a desired cooling condition and responsively entering a fourth mode.

31. A method, as set forth in claim 30, including the step disengaging the clutch mechanism and placing the electrical generator/starter in the second state while in the fourth mode.

32. A method, as set forth in claim 25, including the steps of detecting a predetermined condition indicating insufficient engine power to provide desired engine speed and responsively entering a fifth mode.

33. A method, as set forth in claim 32, including the steps of engaging the clutch mechanism and placing the electrical generator/starter in the second stated while in the fifth mode.

34. A method, as set forth in claim 33, the compressor having at least one piston with a variable stroke, the method including the step of minimizing the variable stroke while in the fifth mode.

35. A system for use with an engine having a first drive shaft, comprising:

a clutch mechanism;

a drive belt for coupling the first drive shaft and the clutch mechanism;

a second drive shaft coupled to the clutch mechanism, the clutch mechanism being adapted to controllably engage and release the second drive shaft thereby coupling and de-coupling the first and second drive shafts, respectively;

an electrical generator/starter being coupled to the second drive shaft;

a battery coupled to the electrical generator/starter;

a compressor coupled to and integral with the electrical generator/starter and to the second drive shaft, for pressurizing a flow of coolant in response to rotation of the second drive shaft, the electrical generator/starter for generating electricity in response to rotation of the second drive shaft while in a first state and for utilizing electrical power from the battery to rotate the second drive shaft while in the second state; and, a controller coupled to the electrical generator/starter, the compressor and the clutch mechanism, for controlling operation thereof in accordance of a plurality of modes of operation for engaging the clutch mechanism and placing the electrical generator/starter in the second state while the system is in a first mode for providing mechanical power from the engine to the electrical generator/starter and to the compressor while in a second mode, and for detecting a predetermined condition indicating insufficient engine power to drive the compressor and to responsively enter a third mode, the predetermined condition being one of an idle condition of the engine, a low speed condition of the engine, or a desired cabin cooling condition.

* * * * *